United States Patent [19]

Garshol et al.

[11] Patent Number: 5,419,979
[45] Date of Patent: May 30, 1995

[54] CHEMICAL REACTOR WITH A GAS SEPARATOR, AND A FRAME FOR USE IN THE REACTOR

[75] Inventors: Tor Garshol, Flateby; Oddvar Bjordal, Frei; Ole Mollestad, Strømmen; Kjell H. Johansen, Mysen, all of Norway

[73] Assignee: Forsvarets Forskningsinstitutt, Kjeller, Norway

[21] Appl. No.: 30,421

[22] PCT Filed: Sep. 25, 1991

[86] PCT No.: PCT/NO91/00125
§ 371 Date: Mar. 22, 1993
§ 102(e) Date: Mar. 22, 1993

[87] PCT Pub. No.: WO92/05599
PCT Pub. Date: Apr. 2, 1992

[30] Foreign Application Priority Data
Sep. 25, 1990 [NO] Norway .................. 904165

[51] Int. Cl.$^6$ .............................. H01M 8/08
[52] U.S. Cl. ........................ 429/27; 429/34; 429/38
[58] Field of Search .................... 429/27, 34, 38

[56] References Cited

U.S. PATENT DOCUMENTS

| | | | |
|---|---|---|---|
| 4,842,963 | 6/1989 | Ross, Jr. | 429/21 |
| 4,871,627 | 10/1989 | Strong et al. | |
| 4,927,717 | 5/1990 | Turley et al. | 424/27 |
| 4,950,561 | 8/1990 | Niksa et al. | 424/27 |
| 5,190,833 | 3/1993 | Goldstein et al. | 424/27 |

FOREIGN PATENT DOCUMENTS 0330849  6/1989  European Pat. Off. .
1457024  1/1976  United Kingdom .

*Primary Examiner*—Stephen Kalafut
*Assistant Examiner*—M. Nuzzolillo
*Attorney, Agent, or Firm*—Merchant, Gould, Smith, Edell, Welter & Schmidt

[57] ABSTRACT

Chemical reactor for reactions involving gas generation comprising feed lines, reaction chambers and outlet lines wherein the outlet lines comprise separate gas removal devices (3'''), preferable disposed at the upper edge of the reaction chamber (1) and having a negligible cross-section in relation to the passage cross-section for the reactor chambers (1).

5 Claims, 4 Drawing Sheets

CHEMICAL REACTOR WITH A GAS SEPARATOR, AND A FRAME FOR USE IN THE REACTOR

The present invention relates to a chemical reactor with a gas separator, more specifically a fuel element that uses a gas as a reaction component.

The invention further relates to a frame that may be set together with an identical frame to form an element to be used in this reactor.

As indicated above, the present invention relates to a chemical reactor where gas is generated in a liquid stream and where gas bubbles may have an unfavorable effect on the intended reactions, or where for other reasons it is desirable to separate out the gas. In particular the present invention may be utilized in connection with electrochemical reactions such as in the interconnection of galvanic cells (electrolyzers, batteries and fuel cells) where gas is formed by unwanted side reactions in the electrolyte, which for example is the case in systems using a gaseous component such as oxygen or air as an oxidation agent, a metal as a reduction agent and a liquid electrolyte.

One area of utilization for the present invention is a galvanic system of the type using aluminum/air fuel cells.

Today, reactors are used where the liquid may only pass through the reactor until a certain upper limit is reached for the gas content in the liquid. When the ratio gas:liquid has become so high that it hinders the flow of liquid in the apparatus, the liquid must be removed from the reactor and led into a separate gas separator or similar device.

Another problem that arises with the current reactor systems that use a plurality of parallel fluid inlets to the reactor is that they are subjected to an uneven supply of fluid in the individual inlets, particularly when the liquid also contains a gas phase or even contains solid particles. To alleviate this problem it is necessary to have separate pumps for each inlet or to provide in some other way for adequate security against clogging and for sufficient balance for the stream of material in the individual inlets.

Part of what is particularly accomplished by the present invention is that the invention enables fluid transport through the reactor even with a high emission of gas in the reactor; furthermore, the invention alleviates problems of uneven supply of liquid to the reactor with parallel inlets, and the invention's subject reduces the problems of electrical short-circuiting between the cells in electrochemical reactors.

Accordingly, the present invention relates to chemical reactors for reactions involving gas generation, comprising feed lines, reaction chambers and outlet lines, and the reactors are characterized in that the outlet lines include separate gas removal devices.

More specifically, the invention relates to a reactor as mentioned above for use in metal/air systems, and these reactors are characterized in that the reaction chambers are composed of two identical frames with means for attachment of an air electrode, depressions forming openings for conducting air past the air electrode, a recessed opening for means to removed the current from the air electrode, a slot for a means for conducting current from the anode, grooves running diagonally through the thickness of two interjoined frames along a side of the frame, grooves along the lower and upper frame sides for transporting electrolyte, and narrow through-going holes provided in each corner of each frame for transporting hydrogen through the holes provided at the upper side of the frame. The invention also relates to frames of the type described in the preceding paragraph.

In the following, for the purpose of simplifying the description of the invention and its applicability, a system comprising aluminum and air will be used as an example of the utilization of the invention.

It should be pointed out, however, that the invention is not limited to the use of an aluminum/air system; in principle it may be used in all types of reactors where a gas phase occurs in a liquid stream and it is desired to remove the gas, and where the liquid stream is to be conducted through the reactor, and where the reactor consists of two or more chambers through which the liquid is to be conducted.

Aluminum/air batteries generally consist of an oxygen reducing cathode, an anode of an aluminum alloy and a liquid electrolyte, for example an aqueous solution of potassium hydroxide. The anode can be made of aluminum, magnesium, zinc or lithium. The cathode is a diaphragm-like structure that often consists of one or more layers of a porous mixture of various carbon and catalyst types and polytetrafluorethylene PTFE, as well as a metal grid made, for example, of nickel.

This grid is to serve as the cathode's current conductor and also endows the cathode with sufficient mechanical strength. The cathode diaphragm keeps the electrolyte from the air and must therefore be impermeable for liquid, i.e., to the electrolyte, while it must at the same time be permeable for air or oxygen.

The cathode reaction takes place as follows: air containing oxygen diffuses into the cathode diaphragm and meets the electrolyte there, thereby reducing the oxygen on the catalytically active diaphragm. In this reduction reaction, electrons will be used up. At the same time, electrons will by given off by oxidation of aluminum at the anode and will thereby cause the production of electrical energy. The aluminum anodes will often have the form of plates that are submerged in the electrolyte and placed in close association with the cathode diaphragm, although without being in direct contact therewith.

The cell current on this galvanic element will be in the range of 0.8 to 1.9 volts, depending on the load and the temperature. To attain the desired operational current, for example 12 volts, a certain number of cells must thus be coupled in series.

Aluminum/air batteries have several advantageous properties compared with other sources of current. Such batteries can be made with a very high energy content relative to the battery's weight and volume. The energy density for such a battery would be capable of reaching 300 watt-hours per kilo, i.e., a level that is comparable to the level for lithium batteries and which is 10 times as high as the level for lead accumulators. At the same time, it can be rechargeable in the sense that it is constructed in such a way that those parts of the battery that are consumed in the discharging process can be replaced when the battery is discharged—that is, the parts are used up, while the rest is retained.

Seen in this way, the invention's system may be referred to as a mechanically rechargeable battery as opposed to an electrically rechargeable system.

The advantage of this system is that the recharging can take place in the course of a few minutes and with a simple hand movement, while it can often take several hours to charge up an electrically rechargeable system.

One of the problems of this Al-air system, however, is that in addition to the desired electrochemical reactions, i.e., the anodic dissolution of aluminum and simultaneous reduction of oxygen, there takes place an unwanted chemical side-reaction as aluminum reacts with the electrolyte:

$$2\,Al + 6\,H_2O \rightarrow 2\,Al^{3+} + 6\,OH^- + 3\,H_2 \qquad (I)$$

Aluminum metal is consumed here without its being utilized for production of electrical energy, and hydrogen gas is mixed in the electrolyte with the consequent danger of problems later on. These problems cons st primarily in the fact that the work needed to pump a gaseous liquid is greater than the work needed for pumping the same liquid without gas, and this work requirement increases with increased gas content.

It will also be possible to fill parts of the cell chambers with gas so that the area of the active electrode surfaces exposed to the electrolyte will be decreased, with weakened output as a consequence thereof. Partially gas-filled cell chambers will also produce an increased internal resistance in the battery.

In addition to this, partially filled cell chambers will give uneven electrolyte movement over the active electrodes, with the resultant possibilities of uneven current distribution and uneven anodic dissolution of aluminum Another problem with the Al-air system is that heat and reaction products are formed from the electrochemical reactions in the cells, namely aluminum hydroxides. Aluminum hydroxides are solid substances that are deposited in the electrolyte during the operation of the Al-air battery. It is therefore necessary to remove these from the cells by pumping the electrolyte continually from the cells to an electrolyte reservoir, in order thereby to prevent the cells from filling up and thus causing a stop in the desired electrochemical reactions. After the electrolyte has undergone a separation and cooling process, it is pumped back to the cells. Pumping of electrolyte through a plurality of electrical series-coupled single cells can be carried out either by pumping the electrolyte from one cell to the next, i.e., by series flow, or by pumping the electrolyte into a collecting duct at the outlet of the cells, i.e., parallel flow.

Flow in series would be preferable in an Al-air system in order thereby to maintain constant and equal flow through all cells. Furthermore, the amount of liquid per time unit that must be pumped through the electrochemical reactor (intercoupling of cells) with flow in series will be only a fraction of the amount of liquid necessary in parallel flow (1/10 in relation to flow in parallel, where the reactor consists of an intercoupling of 10 cells). A parallel coupling of the cells might be expedient in other related battery systems or in other chemical reactors.

It is also important that the electrolyte's movement through the cells be uniform, without there occurring tubulent areas or so-called eddies. Furthermore, the flow rate must be so great that one avoids sedimentation of aluminum hydroxide particles in the cells, and in addition the electrolyte ducts in the cells must not contain narrowed portions that could cause clogging. Furthermore, it is important that conditions be arranged such that the aluminum anodes are dissolved evenly so that a maximum rate of utilization of aluminum is achieved.

A second important point in the interconnection of the cells is that it must be possible to transport oxygen-containing air to the air electrodes and to transport used air away.

Furthermore, it is important that the electrical resistance through the electrolyte ducts between 2 series-coupled cells is sufficiently high that the possibility of self-discharging or short-circuiting through the electrolyte is minimized. This can be accomplished either by making the electrolyte ducts with a sufficiently small cross-section and/or sufficient length, or by constructing them such that there are gas pockets in the ducts at all times.

Furthermore, it is important that the electrical coupling for anode and cathode are such that they give as little resistive loss as possible, and that the connection from one cell to the next is as expedient as possible.

It is also of great importance for the interconnecting of galvanic cells that the cells have low weight and small volume. Furthermore, it is important that the single cells should be inexpensive, which is of course particularly important when the entire group of connected cells is to be replaced, as in the above mentioned case where the aluminum anodes are replaced with new ones, i.e., in a mechanically rechargeable system.

The purpose of the invention is thus, as mentioned above, to construct a reactor consisting of one or more reaction chambers where a liquid containing gas flows through the cell or the chamber and where a separation of gas and liquid at suitable places is required. With this, it will be possible to conduct liquid further through the reactor while the gas is either accumulated or led away, according to wish, or is also collected by means of suitable ducts.

An additional objective of the invention is a reactor where a liquid containing gas may be transported through the reactor without the flow rate of the liquid being affected to any significant degree by the gas production in the reactor.

Furthermore, an objective of the invention is that the pump work necessary in order to transport the liquid-gas mixture at a given rate through the reactor must be approximately dependent on the amount of gas that is present.

Furthermore, an object of the invention is to have the liquid flow with uniform speed through the reactor and to minimize the probability of formation of unsuitable gas pockets as eddies, or the like, in the fluid stream.

Additional subjects for and advantages with the invention will be apparent to the person skilled in the art through a closer study of the above and the following description.

In particular, the following are achieved with the invention:

1) that the interconnection of the elements forms a specific number of galvanic cells through the formation of a corresponding number of chambers for placement of metal anodes—in this case, aluminum plates—with the same number of air chambers into which oxygen-containing air may be conducted, and the possibility for attachment therein of cathode diaphragms for the separation of anode chambers from air chambers. The apparatus is expediently constructed such that the distance between each anode plate and the cathode diaphragm that is present is in the range of 0.5–10 mm before the cell begins to deliver current;

2) that the interconnection of elements forms a practical duct system for transport of electrolyte to and from each reactor, that is, by a galvanic cell, and that the electrolyte transport is adapted as well as possible to the use of the reactor;

3) that, in the case of the reactor's being a galvanic aluminum air cell, the interconnection of the elements permits the feeding of oxygen-containing air, either by natural convection or by active transport of air past the cathode diaphragm. The air ducts must in this case be dimensioned for transport of a quantity of air that is sufficient for production of a specified amount of current, at the same time as the air resistance in the ducts is kept at an acceptable level. The air should preferably be led into the lower part of the cathode chamber and flow evenly therefrom upwards along the cathode diaphragm before it is sent out from the upper part of the cathode chamber; and 4) that the cells obtained according to the invention contain electric couplings to anode and cathode that enable electrical interconnection of the cells.

The invention shall be further illustrated with reference to the accompanying drawings, where:

FIG. 1 schematically shows a reactor according to the invention;

The important feature of the present invention is that by assembling (interconnecting) the element, one can create a practical duct system for transport and distribution of electrolyte and simultaneous separation of gas. At regular intervals in this duct system one obtains, according to the invention, regions where grativational and accelerational forces expediently separate the liquid and gas phase. These regions are also formed in such a manner as to exploit the difference in density between gas and liquid, and such that the surface forces which prevent separation are overcome as easily as possible.

In those cases where gas and liquid are pumped into the reactor in the same direction as the effect of the gravitational forces, the gas/liquid rate will be so great that the accumulation of gas in the reactor area will be avoided.

In a typical utilization of the subject of the invention, therefore, the electrolyte will be pumped upwards into the reactor chamber and the gas separation will take place in a chamber/duct suited thereto above the reactor. Due to the density and viscosity difference between liquid and gas, the gas may be conducted through such narrow ducts that the liquid transport through the same ducts will be minimal. This property is also exploited when one chooses, for reasons related to production or other considerations, to make more thin, narrow ducts than those that are used only for gas transport. Characteristic for this are symmetrical devices that are turned over and coupled together into complete reactors; it would be possible for these to have very narrow ducts both above and below, even though it is only the upper ducts that are used as gas ducts.

These properties are advantageous in the sense that they also cause the "puncturing" of unwanted gas pockets and simultaneously bring about the control of the gas-liquid level in the intended gas pockets (gas/liquid lock). Characteristically, the gas ducts could be parallel in a liquid duct system where one wishes to secure the filling of liquid in all or parts of the system. The considerable difference in viscosity and density between liquid and gas affords an automatic level adjustment with great flexibility in relation to varying and uneven operational conditions. In those cases where it is important to avoid liquid throughout the gas duct system, the gas ducts may contain gas-permeable diaphragms where the liquid flow resistance is infinitely great.

Figure 1:
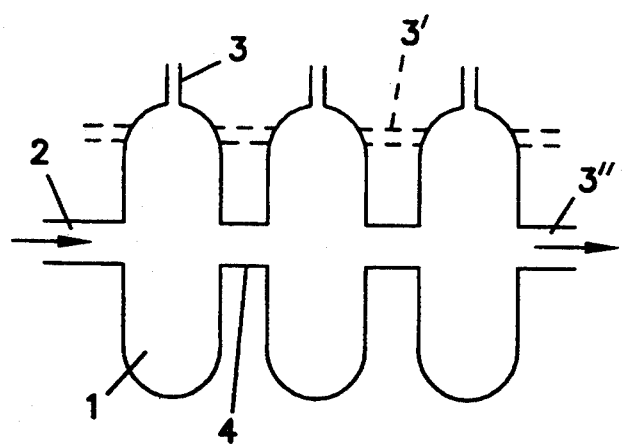

The invention's principal mode of operation is shown schematically in FIG. 1. Here, liquid and gas are conducted through a reactor's inlet pipe 2 to the reactor chamber 1, which has a substantially greater cross-section than the pipe 2. The reactor chamber 1 is designed such that the flow rate of the mixture in a vertical direction in the reactor chamber is substantially lower than the flow rate in the supply line. The gas-containing portion of the liquid/gas mixture will thus collect in the upper part of the reactor chamber. This gas can then be discharged through a suitable duct 3 from the upper part of the reactor chamber while the liquid is conducted out of the reaction chamber through a suitable outlet 4. Several such reaction chambers are intended to be put together into a reactor, as shown in FIG. 1.

Alternatively, the gas discharge from the first reactor may be conducted to the next reactor's upper part through a duct 3', etc., until the gas is finally conducted out from the last reactor's upper part.

A second alternative is that the liquid/gas mixture is conducted into the reactor with parallel inlets from a collecting duct; an inlet for each reactor, and with corresponding parallel outlets to an optional new collecting duct for the gas-deprived liquid.

As an alternative to the embodiment where the liquid supplied to the reactors contains a gas phrase, the liquid to the reactors may have a low gas content, but with gas being produced in the reactor and said gas being separated in the same reactors according to the principle of the invention.

The advantages of the present invention are that, first, the work required to pump liquid/gas mixture through the reactors is reduced substantially in the case where the gas separation is carried out according to the principle of the invention. Further, the pumping work that is necessary is, to a substantial degree, made independent of the amount of gas that is introduced to the liquid phase.

The invention's principle would furthermore make it superfluous to have separate apparatuses for separation of gas prior to supplying of liquid to the reactors.

Finally, the liquid phase could be transported through the reactor in a homogeneous and controlled manner; and the possibility for local gas pockets and uneven gas flow rate in the reactors due to said gas pockets would thus be minimized.

One particular type of reactor that is suitable for the principle of the invention is, as mentioned above, galvanic cells based on metal/air systems. In these galvanic systems, as mentioned above in connection with equation (I), the formation of hydrogen in the cell is an undesirable side-reaction.

The problems that this gas production creates for the electrolyte transport through the cells can in large degree be alleviated by means of the present invention's principle. This is true particularly with respect to the minimizing of the pumping work, since the energy for this work is derived from the system itself and thus influences the system's overall efficiency. It is, furthermore, advantageous to counteract the formation of gas pockets at the electrodes since this impairs the performance of the system and causes an uneven dissolution of the anode plates. Furthermore, the invention contributes toward attaining a more uniform flow pattern along the electrodes, which in turn contributes toward more efficient utilization of the anode plates.

Finally, the invention contributes toward preventing the formation of local eddies or areas with minimal flow rate, which again reduces the possibility for clogging of the cells due to deposits of solid reaction products.

In connection with the above mentioned utilization of the subject of the invention in connection with aluminum/air batteries, the invention shall be described particularly with reference to the FIGS. 2-4A-4B.

Figure 2:
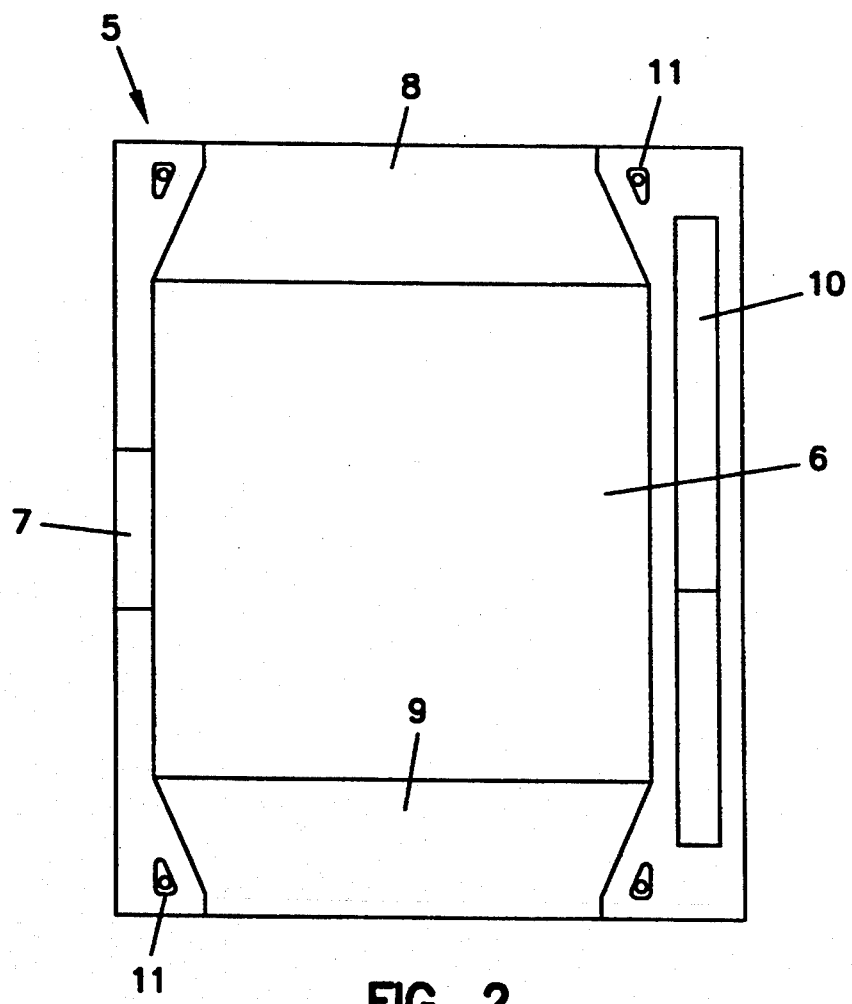
FIG. 2 shows a frame according to the invention, viewed from one side thereof.
Figure 3:
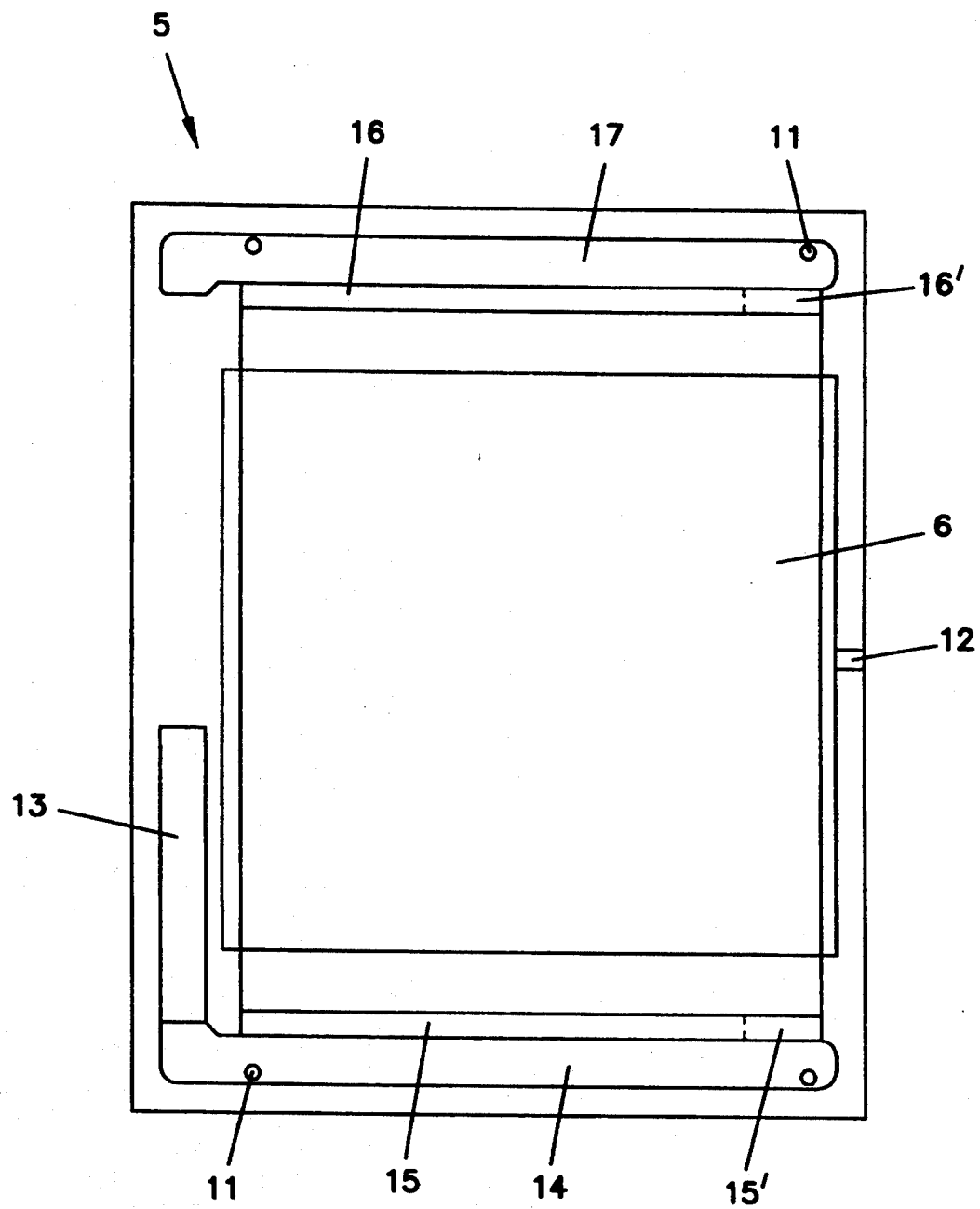
FIG. 3 shows the same frame according to the invention, viewed from the other side.

FIGS. 2 and 3 show a frame according to the invention, whereby one may obtain, by connecting several such frames together, a certain number of galvanic cells. FIGS. 2 and 3 show the frames viewed from the opposite side, while FIG. 4 shows the frames connected together into galvanic cells.

FIG. 2 shows the frame 5 viewed from the side facing the air chamber when the frame is a part of a cell. The frame is formed such that space is provided for mounting of an air electrode 6, for example by its being glued, moulded or welded on, or being secured by another means to the frame. On one side of the frame, a recessed opening 7 has been formed to allow space for means for removing current from the air electrode.

Above and below the air electrode are provided level depressions 8,9, so disposed that when two frames are mounted against each other, an opening is formed for the transport of air, preferably from below and upwards, past the air electrodes. On the opposite side from the current outlet 7, a groove 10 is so designed as to create a duct for the transport of electrolyte when two frames are placed together, and wherein the electrolyte is transported from the anode chamber of one cell to the anode chamber in the next cell.

This duct is designed in such a way that the electrolyte is transported from the upper part of one cell's anode chamber to the lower part of the next cell's anode chamber. This is attained by virtue of the groove's 10 being given a depth that increases evenly from above and downward, until passing clear through at the lower part of the groove 10.

In the frame's four corners there are shown through-going holes 11 that are to serve as gas separation ducts in accordance with the principle of the present invention, In FIG. 3 the frame 5 is shown from the side facing the anode chamber when the frame is a part of a cell. In FIG. 3 there is also shown the space where the air electrode 6 is mounted, viewed from the electrolyte side. The air electrode 6 will form one of the walls of the anode chamber and the frame's thickness will be adapted such that the depth of the anode chamber allows space for the anode plate when two such frames are placed together. On one side of the frame is shown a slot 12 through which passes a means for conducting current from the anode. On the other side of the frame 5 is shown a groove 13 that passes through and forms a duct, namely the same duct that is described as groove 10 in FIG. 2, intended for transport of electrolyte from the upper part of the preceding cell's anode chamber to the lower part of the local anode chamber when two frames are placed together to form a cell.

The electrolyte then flows to a new duct which is formed by the groove or recess 14 when the two frames are put together.

Parallel to and above the recess 14 there is provided a new and shallower depression 15. This provides a slit for the transport of electrolyte up along the anode plate when two frames are put together. The reason the depression 15 is shallower than the recess 14 is that the flow resistance in the collecting duct—that is, recess 14—should be lower than the flow resistance over the narrow slit or depression 15, thereby to ensure approximately equal flow rate along the entire slit and thus also a uniform and level flow front along the anode plate. Above the anode chamber there is made a corresponding slit with the depression 16 on the frame and a new collecting duct at the depression 17 on the frame 5. In a further variant these recesses 15 and 16 are provided with an extra depression 15', 16' at the end of the cell chamber that is furthest from the inlet. These extra depressions ensure a minimum flow through the entire supply/discharge duct 14/17 so that one avoids in this way an increasing sedimentation of reaction products innermost in the duct where there would otherwise have been an area with a flow rate decreasing toward 0, thus, an eddy.

Figure 4A:
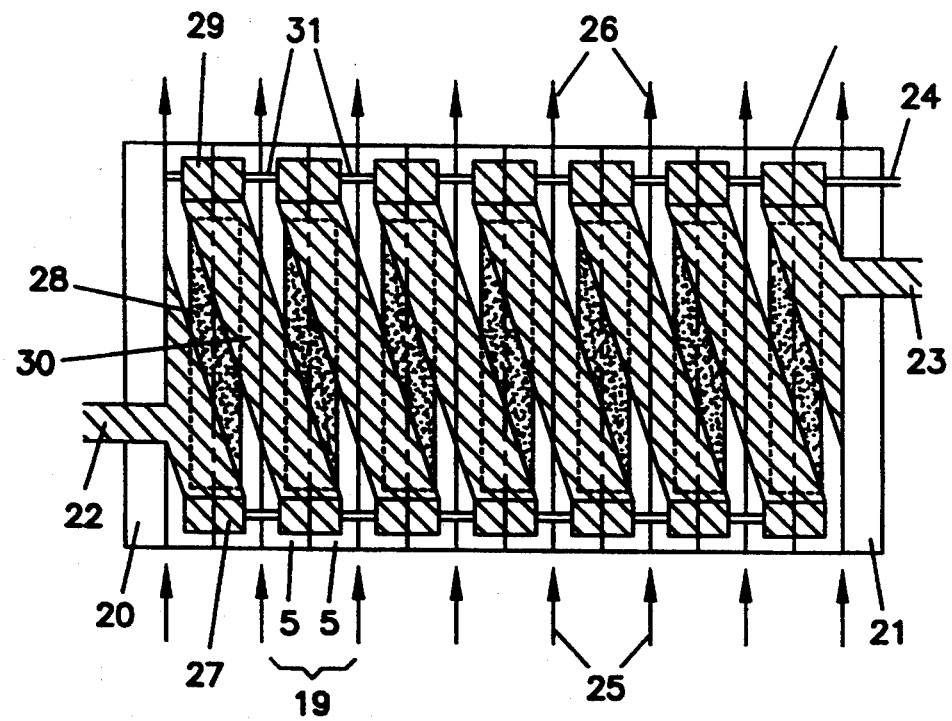
FIG. 4a shows a cross-section through a reactor according to the invention.
Figure 4B:
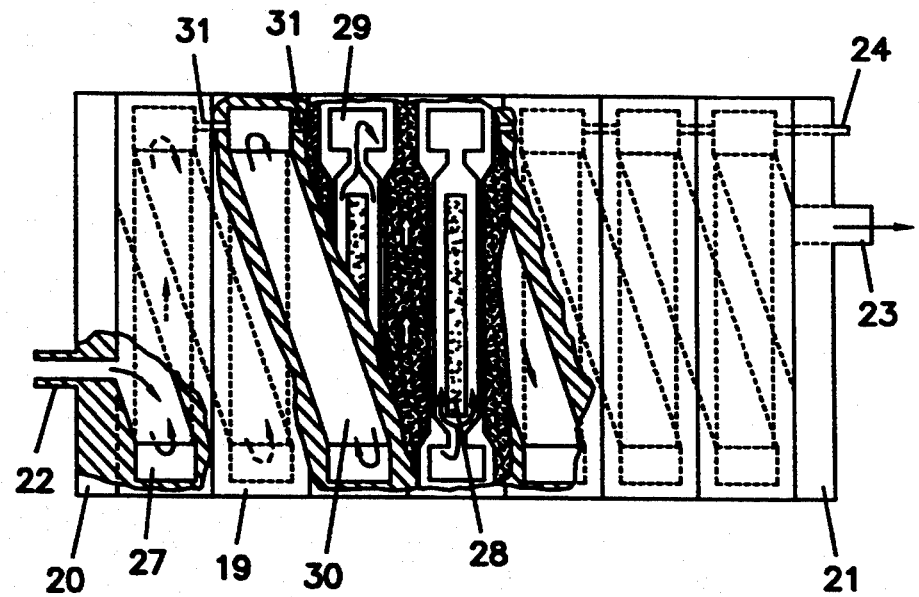
FIG. 4b shows the reactor according to the invention, partly opened, to illustrate the air and electrolyte movements.

The electrolyte then flows down to the lower part of the next anode chamber by virtue of the fact that the groove 13 forms a duct when two frames are placed together. In the corners of the collecting ducts there are indicated through-going holes 11 for gas separation. These holes 11 are situated in the electrolyte ducts, which necessitates that the diameter of the holes be substantially smaller than the diameter of the electrolyte ducts, allowing only a minimal amount of electrolyte in a given case to be transported through these gas ducts, while at the same time the diameter of the holes 11 is large enough to enable effective gas transport. Particularly when the holes 11 are situated in the cell's upper part, they are effective as gas separation ducts. When the frames are coupled together to form cells and the cells are placed together to form reactors, there are created, according to the invention, through-going gas ducts through out the entire reactor so that the gas may finally be conducted away from the last cell in the reactor. Cells, consisting of the invention's frames and assembled into a reactor, are shown in FIGS. 4A and 4B, which illustrates 7 galvanic aluminum/air cells. Two frames 5 form a cell 19. The end plates 20 and 21 in the reactor consist of slightly modified frames where the electrolyte inlet 22 and outlet 23 and the gas outlet 24 are incorporated. The arrows 25 and 26 mark the placement of the air slits as well as the direction of the process air that is conducted past the air electrodes.

The electrolyte stream is introduced at the inlet 22, thereafter to enter the collecting duct 27 in cell no. 1. From there the electrolyte is conducted up through the anode chamber along the anode plate 28 and up to the upper collecting duct 29, whereafter the electrolyte is then conducted down along the slanting transport duct 30 to the lower collecting duct 27 in the next following cell, and so on.

The hydrogen gas formed in the anode chambers will rise together with the electrolyte stream and will at first collect in the upper collecting duct 29, but from there will be transported through the gas ducts 31 until it is led out at the gas outlet 24.

The embodiment form of the frame 5 shown in FIGS. 2 and 3 and an interconnection of these frames as indicated in FIG. 4 affords a number of advantages compared with what can be attained through the known technique.

Figure 5:
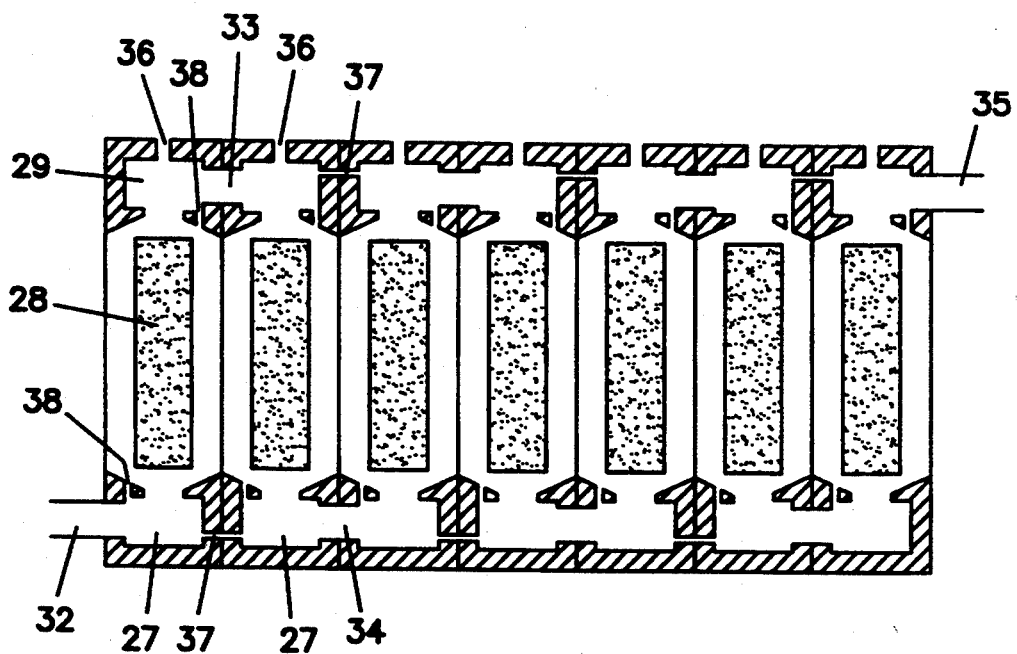
FIG. 5 shows an alternative embodiment form of the reactor according to the invention.

Another embodiment form of the invention is shown in FIG. 5. Here there are shown 7 galvanic aluminum-/air cells, coupled together in the manner shown in FIG. 4A and 4B, but with an altered duct course relative to FIG. 4A and 4B.

The electrolyte stream is conducted into the lower collecting duct 27 in cell no. 1 through the inlet 32, thereafter to flow up along the anode plate 28 to the upper collecting duct 29. The electrolyte is then transported to the next cell's upper collecting duct 29 through the duct 33. Therafter the electrolyte runs down along the anode 28 in cell no. 2 to the lower collecting duct 27 in cell no. 2, to be then conducted to the third cell's lower collecting duct 27 through duct 34.

This sequence is then repeated until the electrolyte is led out through the outlet 95. This manner of sending the electrolyte through the cells has the effect of a series flow through the cells.

The hydrogen gas produced in the cells is conducted out from each cell's upper collecting duct 29 through a separate gas outlet 36, alternatively through gas ducts 37 between the cells, then to be gathered up, for example, from the gas outlet 36 from the outer cells.

To counteract the possible accumulation of gas in the cell chamber's upper part due to the narrow slit between the cell chamber and the collecting duct, one may alternatively form a gas duct 98 as shown in FIG. 5.

The advantage of this design is that one avoids a separate duct for down-flowing liquid, thus acquiring a more compact structure.

In this embodiment form of the invention, the air to the cathode is introduced in a transverse current. Another example of an embodiment form of the invention, using FIG. 5 as a point of departure, is to allow the ducts 33 and 34 to pass through to all of the cells, which would mean that the electrolyte is transported from the inlet 32 and fills up all the collecting ducts 27 before the electrolyte is sent up along the anodes 28 in all the cells simultaneously, instead of conducting the electrolyte up or down in the anode chamber, depending on the placement of the cell in the row of single cells. The electrolyte will then fill up the upper collecting ducts 29 before being conducted through the ducts 33 (which pass between all the cells) and to the outlet 35. This would represent a parallel flow. The gas outlets could in this embodiment form be designed as shown in FIG. 5.

Figure 6:
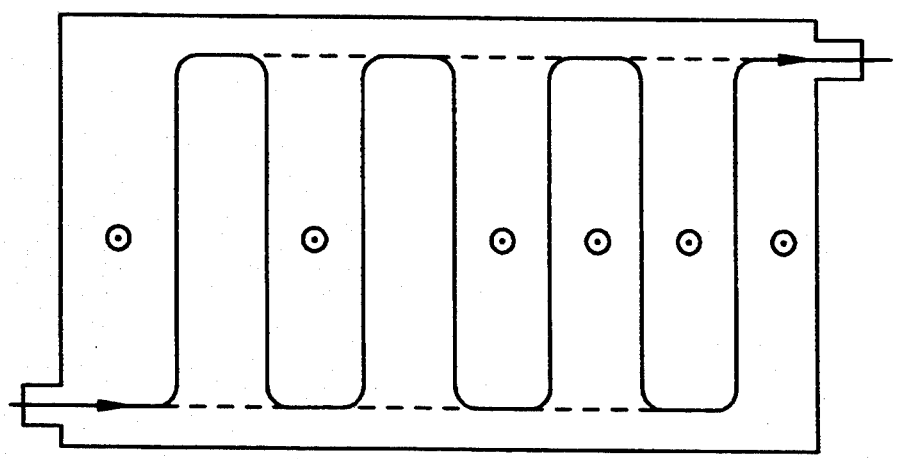
FIG. 6 illustrates the course for electrolyte and air in the reactor according to FIG. 5.

FIG. 6 shows the last indicated circuit course where the solid line represent; the course of the electrolyte, the dotted line represent; the course of the gas, and the arrow points represent the course of the air.

First, one attains through the subject of the invention when used as shown above a very effective and simple separation of a hydrogen gas produced in the galvanic cells.

The invention further makes possible the fact that the amount of energy needed to pump electrolyte through the cells is approximately independent of the amount of gas that is produced at any time.

This then means that the pump work is constant and independent of the operational conditions and other parameters that influence the formation of hydrogen gas in the system, at the same time as the pump work is kept at a minimal level and thus, on the whole, contributes toward an improvement of the system's overall efficiency.

By separating the gas in the manner indicated above, one minimizes the formation of gas accumulations in the anode chambers and therefore: minimizes problems in connection with gas pockets in the chambers, which would lead to lower total electrode surface for exposure to the electrolyte, and thus a reduced output.

Further, one obtains a smooth and uniform flow of electrolyte past the electrode with a consequent reduced probability for formation of turbulent areas and eddies in the anode chamber.

In addition, the invention's frames 5 and the connecting together thereof as shown in FIG. 4 provides for a flow of electrolyte through the cells from one cell to the next, i.e., a series flow. This has the advantage that the total amount of liquid to be pumped through the cells is only a fraction of what would be necessary with parallel flow as indicated above. This then means that substantially less pump work is required to obtain a specific flow rate for electrolyte through the anode chamber.

A further advantage is that the electrolyte flow passes from below and up through the anode chamber in all cells, which provides for equal flow conditions and operational conditions in all cells.

Still another advantage is that the frames 5 contain all necessary functions (except for the end plates) to be able to serve as "building blocks" for the formation of any number of similar cells. This has the advantage that the frame 5 may be produced in a very large number of cells instead of its being necessary to have inventories of several types of elements. This in turn contributes to lower production costs and facilitates production.

The frame according to the invention may of course be produced from any appropriate material but is preferably made of a suitable plastic material by means of conventional injection moulding techniques, which gives low production costs per unit and possibilities for large production quantities.

We claim:

1. A metal/air cell for reactions involving gas generation from a liquid electrolyte, comprising:
   reaction chamber wherein gas is generated from a liquid electrolyte;
   feed line for feeding a liquid electrolyte to said reaction chamber;
   outlet line for removing a liquid electrolyte from said reaction chamber; and
   gas removal devices comprising through-going holes at an upper edge of said reaction chamber for providing gas removal from liquid electrolyte, wherein said through-going holes are sufficiently narrow to minimize liquid transport therethrough but allow gas to be conducted therethrough.

2. The metal/air cell according to claim 1, further comprising an anode and a cathode; wherein said anode comprises a material selected from the group consisting of aluminum, magnesium, zinc and lithium; and said cathode comprises an air electrode which is an oxygen reducing diaphragm.

3. The metal/air cell according to claim 1, wherein said reaction chamber comprises two identical frames joined together, wherein said identical frames have an attachment means for attachment of an air electrode, depressions forming openings for conduction of air past an air electrode attached to said identical frames by said attachment means, a recessed opening for removal of current from an air electrode attached to said identical frames by said attachment means, a slot for conduction of current from an anode, grooves running diagonally through said frames and along lower and upper frame sides for transport of electrolyte, and through-going holes provided in each corner of each frame wherein through-going holes provided at upper frame side are capable of transporting hydrogen.

4. The metal/air cell according to claim 3; wherein an air electrode is secured to said identical frames by gluing, welding, or molding.

5. A frame for use in a metal/air cell 3, comprising attachment means for attachment of an air electrode, depressions forming openings for conducting air past an air electrode attached by said attachment means, a recessed opening for removal of current from an air electrode attached by said attachment means, a slot for conduction of current from an anode, grooves running diagonally along frame side and along lower and upper frame side for transport of electrolyte, and narrow through-going holes provided in each corner of frame wherein through-going holes provided at upper frame side are capable of transporting hydrogen.

* * * * *

UNITED STATES PATENT AND TRADEMARK OFFICE
CERTIFICATE OF CORRECTION

PATENT NO. : 5,419,979
DATED : May 30, 1995
INVENTOR(S) : Garshol et al.

It is certified that error appears in the above-indentified patent and that said Letters Patent is hereby corrected as shown below:

On front page, item [73], line Assignee, "Forskningsinstitutt" should be --Forskingsinstitutt--.
In column 3, line 15, "cons st" should be --consist--; line 29, insert --.-- after the word "aluminum".
In column 6, line 45, "phrase" should be --phase--.
In column 9, lines 16 and 17, "Fig." should be --Figs.--; line 29, "95" should be --35--; line 40, "98" should be --38--; lines 62 and 63, "represent" should be --represents--.
In column 10, line 23, "Fig.4" should be --Figs. 4A and 4B--.
In column 12, claim 5, line 6, delete "3" after the word "cell"; claim 5, line 14, delete "narrow" after the word "and".

Signed and Sealed this

Twenty-seventh Day of August, 1996

Attest:

BRUCE LEHMAN

*Attesting Officer*     *Commissioner of Patents and Trademarks*